United States Patent
Gebbeken et al.

(10) Patent No.: US 10,327,376 B2
(45) Date of Patent: Jun. 25, 2019

(54) MULTIPLE SINGLING DEVICE

(71) Applicant: Lemken GMBH & Co KG, Alpen (DE)

(72) Inventors: Martin Gebbeken, Alpen (DE); Dennis Bergerfurth, Rees (DE); Mark Berendsen, Lengel (NL); Marcel Geraats, Nettetal (DE); Christian Gotzen, Viersen (DE); Thomas Lukas, Ahaus-Wullen (DE); Christian Paessens, Issum (DE); Dieter Werries, Alpen (DE); Andreas Van Kann, Dahlem (DE)

(73) Assignee: LEMKEN GMBH & CO KG (DE)

( * ) Notice: Subject to any disclaimer, the term of this patent is extended or adjusted under 35 U.S.C. 154(b) by 0 days.

(21) Appl. No.: 15/565,822

(22) PCT Filed: Apr. 15, 2016

(86) PCT No.: PCT/DE2016/100179
§ 371 (c)(1),
(2) Date: Oct. 11, 2017

(87) PCT Pub. No.: WO2016/165696
PCT Pub. Date: Oct. 20, 2016

(65) Prior Publication Data
US 2018/0110179 A1    Apr. 26, 2018

(30) Foreign Application Priority Data
Apr. 15, 2015 (DE) .................. 10 2015 105 769

(51) Int. Cl.
*A01C 7/04*     (2006.01)
*A01C 7/12*     (2006.01)
*A01C 5/06*     (2006.01)

(52) U.S. Cl.
CPC ............. *A01C 7/046* (2013.01); *A01C 7/04* (2013.01); *A01C 7/044* (2013.01); *A01C 7/123* (2013.01); *A01C 5/064* (2013.01)

(58) Field of Classification Search
CPC .......... A01C 7/04; A01C 7/042; A01C 7/044; A01C 7/046; A01C 7/123
See application file for complete search history.

(56) References Cited

U.S. PATENT DOCUMENTS

| 1,901,300 A * | 3/1933 | Johnson ................ A01C 5/068 222/267 |
| 4,799,291 A * | 1/1989 | Ankum ................. A01C 7/046 16/259 |
| 6,672,228 B1 * | 1/2004 | Groelz ................ A01C 21/005 111/177 |
| 7,051,663 B2 | 5/2006 | Meyer et al. |

(Continued)

FOREIGN PATENT DOCUMENTS

| CA | 2982006 A1 | 10/2016 |
| DE | 102006031272 A1 | 10/2007 |

(Continued)

*Primary Examiner* — Alicia Torres
(74) *Attorney, Agent, or Firm* — The Watson IP Group, PLC; Jovan N. Jovanovic

(57) ABSTRACT

A multiple singling device is mounted on a row unit of an agricultural single-seed drilling machine and has a split housing with a multifunctional center piece.

7 Claims, 5 Drawing Sheets

(56) References Cited

U.S. PATENT DOCUMENTS

| | | |
|---|---|---|
| 8,789,483 B2 | 7/2014 | Gilstring |
| 2002/0088383 A1 | 7/2002 | Barry et al. |
| 2015/0351315 A1* | 12/2015 | Wendte ................ A01C 21/005 |
| | | 111/183 |
| 2016/0192580 A1* | 7/2016 | Wendte .................. A01C 19/02 |
| | | 111/177 |
| 2018/0110179 A1 | 4/2018 | Gebbeken et al. |

FOREIGN PATENT DOCUMENTS

| | | | |
|---|---|---|---|
| DE | 102010015913 A1 | 9/2011 | |
| DE | 102013111356 A1 | 4/2015 | |
| EP | 2427043 A1 | 3/2012 | |
| EP | 2480063 A1 | 8/2012 | |
| EP | 3282821 A1 | 2/2018 | |
| WO | WO-2007064184 A2 * | 6/2007 | ............. A01C 7/044 |

* cited by examiner

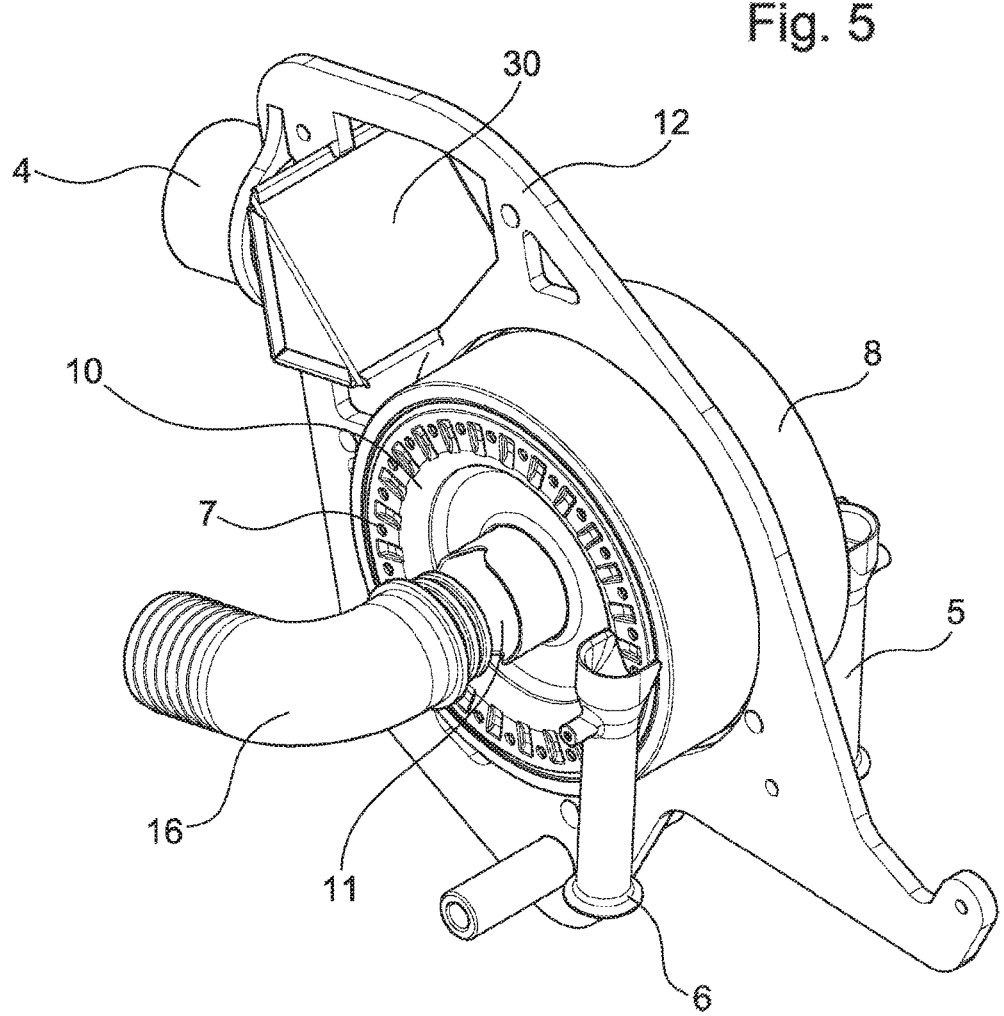

MULTIPLE SINGLING DEVICE

BACKGROUND

The invention relates to an agricultural air seeder machine, generally of the type having a plurality of furrow openers for laying seed separated by the multiple singling device. An inlet opening comprises at least two seed outlets, each of which guides a single seed into a furrow opener. The multiple singling device has at least one rotationally driven singling device arranged in its outer region with regularly arranged recesses which surround the singling device on a first side in its lower region. Further, the singling device comprises a housing to accommodate a seed stock, wherein the seed stock surrounds the singling device on a first side in its lower region. By means of a pneumatic pressure drop, existing between the first side and the second side of the singling device, individual seed is deposited on the first side of the singling device in its recesses and is drawn from the seed stock into a seed outlet by an interruption in the pressure drop.

Air seeders deposit seed at defined longitudinal distances in seed furrows, which are drawn in the soil transversely to each other by means of furrow openers. A distinction is made between seeders operating mechanically or pneumatically through pressure differentials (discussed later herein). In order to achieve the defined seed spacing, a seeder is individually or centrally assigned to each furrow opener.

The latter is, for example, shown in the German application DE 10 2010 015 913 A1 as well as DE 10 2006 031 272 A1. Due to the flexible cable routing from the fixed seeder to the furrow openers moving over the ground, this system may be prone to seed laying inaccuracies.

Alternatively, as shown in EP 2 480 063 A1, the seeder may be assigned directly to the row unit with furrow openers, which in general leads to higher seed laying accuracy.

In order to combine the advantages of a series culture with a better distribution of the individual plants, furrow openers with associated seeders are arranged one behind the other and/or offset side by side. Starting from an original range of 30 inches (750 mm), U.S. Pat. No. 7,051,663 B2 halves the distance of the seed furrows to 15 inches (375 mm) by comprising double the number of seeders and furrow openers, but with an increased space requirement due to the longitudinal offset of the individual seeders.

Starting from the aforementioned prior art, among other objects, an object of the invention is to provide a seeder or a row unit thereof, which avoids the respective disadvantages above, but makes possible the assignment of a seeder to a plurality of furrow openers.

SUMMARY OF THE DISCLOSURE

This object is achieved by the housing surrounding the singling device which is designed in several parts, namely a central web element carrying the housing, and at least one housing half arranged on the right and left of the web.

Due to the division of the seeder into a right and a left half of the housing, which are fastened to a central web, the seed may be supplied to the furrow openers via the respective outlets by the shortest possible path, resulting in a compact housing unit which allows a narrow spacing between at least two furrow openers.

An advantageous arrangement is achieved by assigning a drive unit, for example a motor, to the rotary drive of the singling device to one housing half, and assigning on the opposite housing side an air discharge opening for producing a pneumatic pressure difference between the individual regions of the singling device.

If the seed outlets are directly assigned to the housing halves, an assembly-compatible combination with a defined assignment of the outlets in interaction with the separating body is achieved.

Due to the central web arrangement, the entire structure of the row unit, consisting of furrow openers and, arranged above them, a seeder with outlet openings, may be symmetrically arranged to allow seed transport without lateral deflections of the transport lines, which is advantageous for the seed laying accuracy. In this case, the outlet openings, transport lines and the associated furrow openers lie one above the other in a vertical plane. The respective planes are located at the average distance between the seed furrows drawn by the furrow openers in the ground.

If the central web has at least one breakthrough opening, the singling device may be designed, for example, in the shape of a cylinder or disk, or else its drive or supporting elements may extend into the right and left housing halves.

If at least the central web element is provided with an inlet for filling the housing with seed, seed filling of both housing halves may be effected simultaneously through the central web and opening arrangement. In this case, guide elements for seed guidance may be assigned at the inlet opening.

By providing the housing halves with guide and clamping devices, which clamp the housing halves relative to one another or against the central web, an assembly-compatible but repeatable assignment of the components to one another may be achieved. The respective contact surfaces of housing and/or the central web are approximately airtight relative to one another or are sealed by means of auxiliary elements. This reliably maintains a pneumatic pressure gradient to ensure separation between the housing, the singling device and the environment.

If the housing or its inlet opening is connected to a larger seed storage container, seed may be replenished continuously or at intervals by gravity or via an air flow into the singling device. At the same time, the transport air flow may also be used to build up a pressure drop between the housing and the singling device as well as the accelerated removal of seeds from the outlet openings towards the furrow openers.

The invention is distinguished in particular by the fact that a singling device is provided with dismountable housing halves, which are flanged or arranged on the right and left of a central web element. The central web forms a central multifunctional fastening bracket between the central singling device and the frame of the row unit, which guides the furrow openers. This results in a fixed assignment of the singling device to at least two furrow openers, wherein easy, error-free assembly and accessibility of the components, in particular the singling device, is achieved. The compact arrangement permits a maximum installation space between the row units or a minimum possible row spacing between two adjacent furrow openers.

BRIEF DESCRIPTION OF THE DRAWINGS

Further details and advantages of the subject matter of the invention may be gathered from the following description and the associated drawings, in which an exemplary embodiment with the necessary details and components is shown. For the sake of improved understanding of the application, the multiple singling device, where necessary, is also referred to as a singling device.

FIG. 5 shows the singling device without housing halves.

DETAILED DESCRIPTION OF THE DRAWINGS

Figure 1:
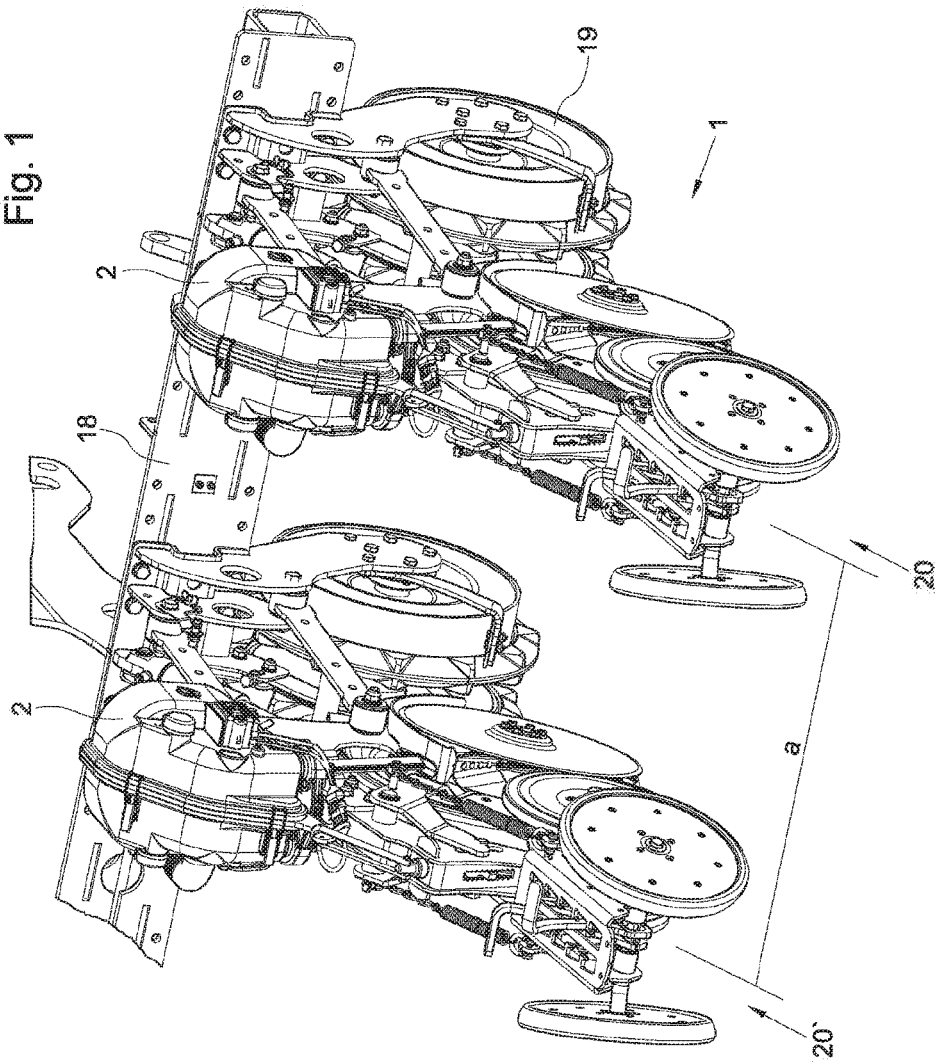
FIG. 1 shows a perspective view of the basic structure of an agricultural seeding drill.

FIG. 1 shows the essential components of the air seeder 1. On the frame 18, which extends transversely to the direction of travel and is mounted with a front bracket on a tractor or a chassis, a plurality of row units 20, 20' are attached laterally, for example at an average distance a of 30 inches or 750 mm. Other ranges are possible. Not shown are a central seed tank and a fan for generating an air flow. This air flow is used for the seed transportation by means of transport lines between the seed tank and the respective seeder 2, but also for establishing a pressure difference for the operation of the air seeder 2. The air seeder 1 is guided above the ground by means of supporting rollers 19, or may also be guided via the tractor or the chassis. The frame may be rigid, multi-part and movable or foldable. Only two of several row units 20, 20' are shown.

Figure 2:
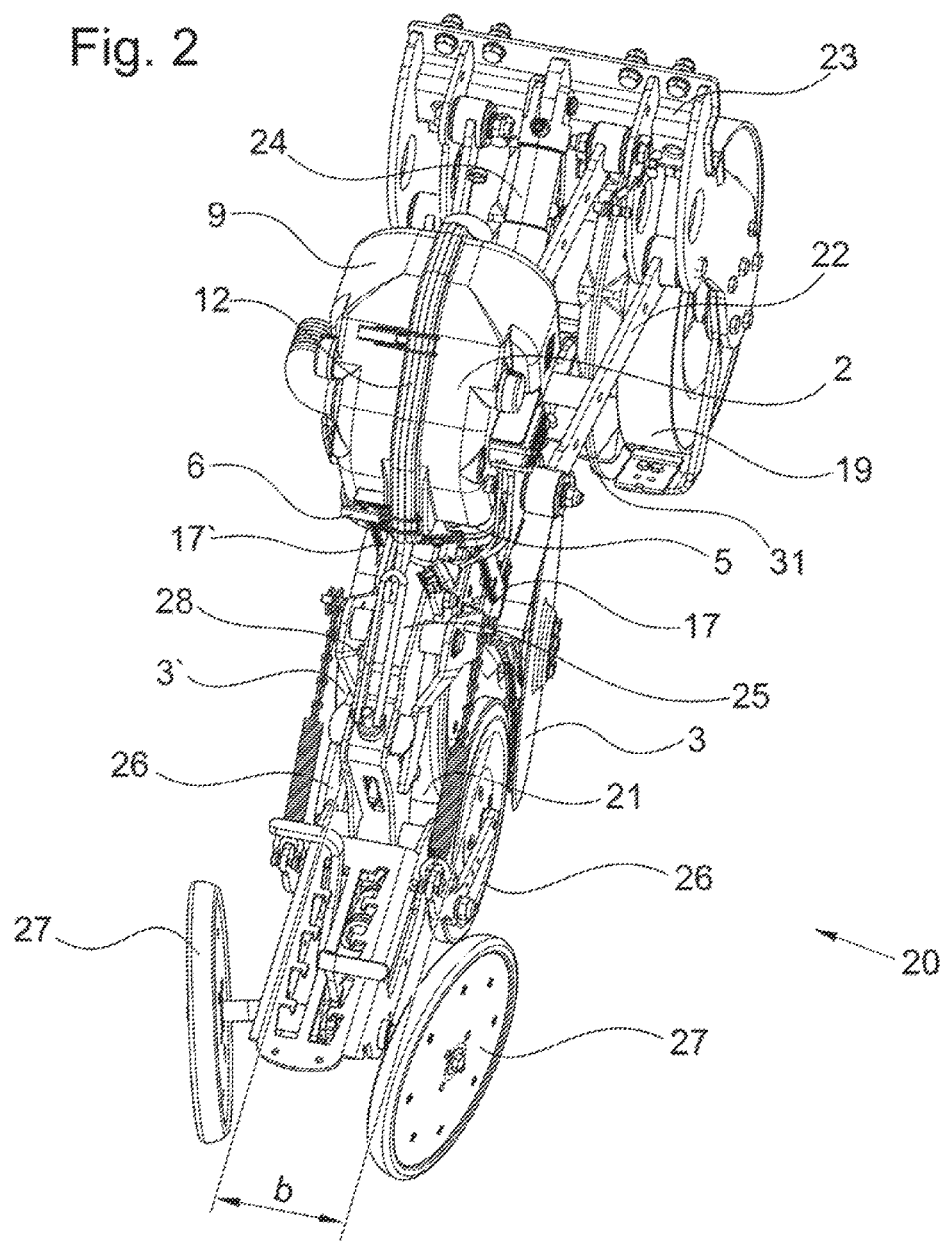
FIG. 2 shows a single row unit from FIG. 1.

FIG. 2 shows a single row unit 20. This is fastened with a front flange or bracket 23 to the frame 18 as described in FIG. 1. A supporting roller 19 is rotatably mounted below the flange surface. This is encased in two groove profiles 31. The mean spacing of the groove profiles 31 here is approximately 5 inches or 125 mm and corresponds to the distance b of the furrow openers 3, 3', wherein the groove profiles 31 pre-compact the ground locally and preform two grooves into which the following furrow openers 3, 3' cut a furrow and lay the seed at a defined depth. Not shown is an additional fertilizer that may be placed in front of or behind the running axle of the support roller 19 and by means of which a strip of fertilizer may be placed between the two furrows for nutrient supply of the plants. The two furrow openers 3, 3' are designed as double disc coulters and are connected to the front bracket 23 in the flange region of the row unit 20 via the center frame 25 and a parallelogram guide 22 or other suitable suspension. The weight of the seeder may be transmitted to the furrow openers by means of an energy store 24, in this case a hydraulic cylinder. The furrow opener may also be withdrawn from the energy store or the contact pressure thereof may be varied. A center wheel 21 is located centrally and in the same circumferential rotary position between the two furrow openers 3, 3', in this case double disc coulters, for precise and adjustable depth guidance of the furrow openers 3, 3'. Behind each furrow opener 3, 3' is an optional pressure wheel 26 as well as one or two closing wheels 27 for closing the seed furrow with soil material. Here, two closing wheels 27 are shown, which jointly close the double furrows behind the furrow openers 3, 3'. It is also possible to mount two pairs of wheels, additional pressure rollers or spreading elements. A seed line 17, 17' runs in a vertical plane from a respective furrow opener 3, 3', and also approximately at a distance b from a furrow opener 3, 3', upwards to the seeder, which is located above the furrow openers 3, 3' and the center wheel 21. The middle frame 25 continues upwards in the central web 12, which separates the two housing halves 13, 14 approximately centrally, to form the outer boundary and the housing 9 of the seeder 2 with the two housing halves 13, 14. A threaded spindle with foldable handle 28 serves to adjust the height of the center wheel 21 with respect to the furrow openers 3, 3' and is secured against rotation by means of a rearward extension of the central web 12 with a linchpin.

Figure 3:
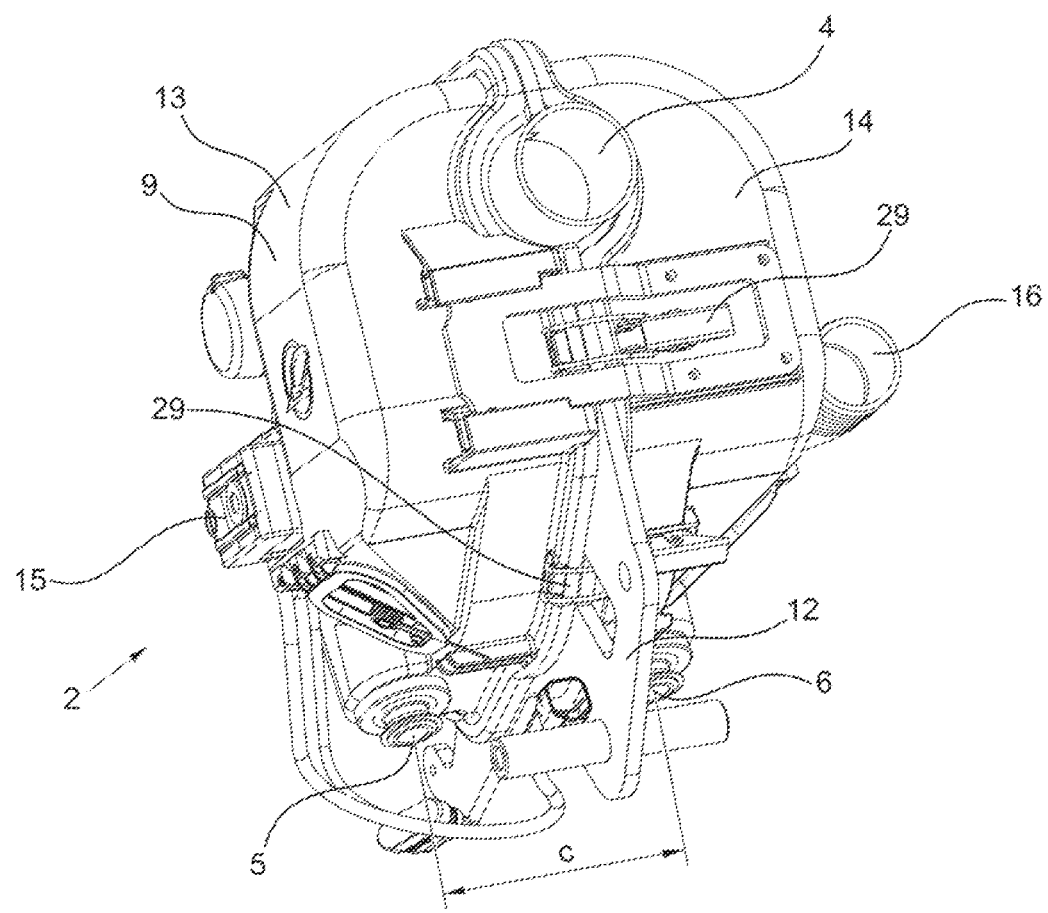
FIG. 3 shows a separation unit.

FIG. 3 shows the seeder 2. The outer housing 9 is formed from the left and right housing halves 13, 14 with the inner web 12 lying on the inside. The central web 12 is fixed in the lower region as described above on the center frame 25 of the row unit 20 and carries the entire seeder 2. At several points, clamping devices 29 enclose the two housing halves 13, 14 and press these tightly against the central web 12. The two seed outlets 5, 6 emerge below the housing halves 13, 14, and through which the separated seed is discharged into the two furrow openers located below. Distance c of the two seed outlets 5, 6 corresponds approximately to the distance b of the furrow openers 3, 3' from FIG. 2. A drive unit 15 is connected laterally to the housing half 13 and powers the rotary drive of the internal singling device 8 which is not visible here. In the upper, front region of the central web 12, the inlet opening 4 emerges from the housing 9. In this case, this inlet opening 4 is fixedly connected to the central web 12 and remains thereon when the housing halves are released. A hose line, which connects the seeder 2 to the storage tank and the fan for establishing a pressure difference and for the supply of seed, as described above, is not shown.

Figure 4:
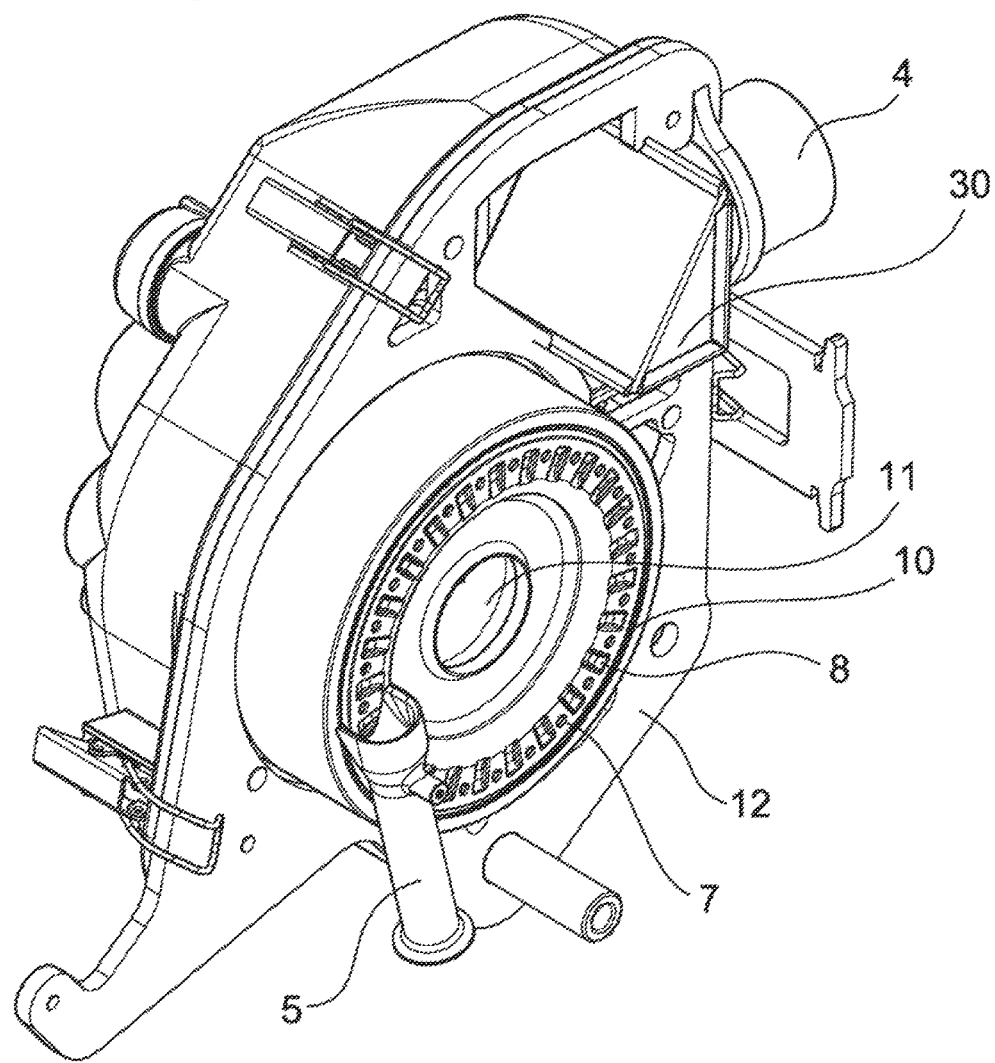
FIG. 4 shows the singling device with only one housing half.

FIG. 4 shows the half-open housing 9 without the housing half 13 and drive unit 15 from the previous FIG. 3. Seed is blown by an air flow through the inlet 4 into the housing until a filling level of up to a maximum at the lower half of the singling device 8. The filling level may be monitored and regulated by means of a device. The singling device 8 is formed as a rotating hollow body with an inner side 11 and an outer side 10. A guide device 30 divides the seed stream from the inlet opening 4 between the two housing halves 13, 14. As a result of the pressure difference built up between the outer side 10 of the singling device and its inner side 11 by the airflow from the inlet opening 4, seeds are deposited in the recesses 7. By the rotation of the singling device 8 counterclockwise, the seeds are individually fed from the lower filling level to the rear seed outlet 5, 6, where they are separated by an interruption in the pressure difference, for example, by means of a diaphragm or wheel on the inside 11 of the singling device, detached therefrom and blown downwards into the furrow opener 3, 3' through the air flow continuing to the outlet opening 5, 6.

FIG. 5 is also opened around the second housing half and shows the separation situation, as already described under FIG. 4. There remain to be seen the singling device 8, the inlet opening 4 with the guide element 30, the seed outlets 5 and 6, as well as the air discharge opening 16, which maintains the atmospheric pressure balance between the inner side 11 of the singling device 8 through the non-illustrated housing half. A rotary passage is arranged in the transition of the singling device 8 to the air discharge opening 16, because the singling device 8 rotates and the air removal opening 16 is fixed to the housing. The recesses 7 of the singling device 8 are arranged uniformly on the partial circle formed by them, wherein the opposite recesses 7 from FIG. 4 are arranged offset by a half stepping angle. As a result, seeds are alternately discharged into the right and left seed outlet, wherein the seeds are laid alternately at half the seed spacing in the laterally adjacent seed furrow, which optimizes the distribution of plant space to them.

LIST OF REFERENCE NUMERALS

1 Air seeder
2 Multiple singling device

3 Furrow opener
4 Inlet opening
5 Seed outlet
6 Seed outlet
7 Recess
8 Singling device
9 Housing
10 Outer side
11 Inner side
12 Web element
13 Housing half
14 Housing half
15 Drive unit
16 Air discharge opening
17 Seed line
18 Frame
19 Supporting roller
20 Row unit
21 Center wheel
22 Suspension
23 Bracket
24 Energy store
25 Central frame
26 Pressure wheel
27 Closing wheel
28 Spindle
29 Clamping device
30 Guide element
31 Groove profile

The invention claimed is:

1. A multiple singling device for an agricultural air seeder, wherein an air seeder comprises a plurality of furrow openers for laying seed separated by the multiple singling device, an inlet opening, and at least two seed outlets, each of which guides a single seed into a furrow opener, wherein the multiple singling device has at least one rotationally driven singling device arranged in its outer region with regularly arranged recesses which surround the singling device on a first side in its lower region, wherein the singling device comprises a housing to accommodate a seed stock, wherein the seed stock surrounds the singling device on the first side in its lower region by a pneumatic pressure drop, existing between the first side and a second side of the singling device, the single seed is deposited on the first side of the singling device in its recesses and is drawn from the seed stock into the at least two seed outlets by an interruption in the pressure drop, wherein the housing, surrounding the singling device, includes a central web element carrying the housing, and housing halves arranged on a right and left of the central web element; and wherein the central web element comprises at least one breakthrough opening, through which the singling device, a drive, or a bearing shaft extends.

2. The multiple singling device according to claim 1, wherein the one housing half from the housing halves has a drive unit for the singling device and the other housing half from the housing halves has an air discharge opening for generating the pressure drop in the housing.

3. The multiple singling device according to claim 1, wherein the housing halves respectively comprises the at least two seed outlets, which are connected to a furrow opener for seed laying.

4. The multiple singling device according to claim 1, wherein the central web element is arranged approximately midway above at least two adjacent furrow openers, wherein a distance between seed outlets, respectively, relative to one another is measured laterally relative to the central web element, wherein a row width or a furrow spacing of the furrow opening respectively corresponds approximately to furrows drawn in a ground.

5. The multiple singling device according to claim 1, wherein the central web element comprises the inlet opening for filling the housing with seed.

6. The multiple singling device according to claim 1, wherein the housing includes guide and clamping devices which are arranged laterally with respect to the central web element and ensure a form- and/or force-locking fixing of the housing halves to the central web element.

7. The multiple singling device according to claim 1, further comprising a seed storage container is-associated with the housing or the inlet opening.

* * * * *